Patented Dec. 25, 1951

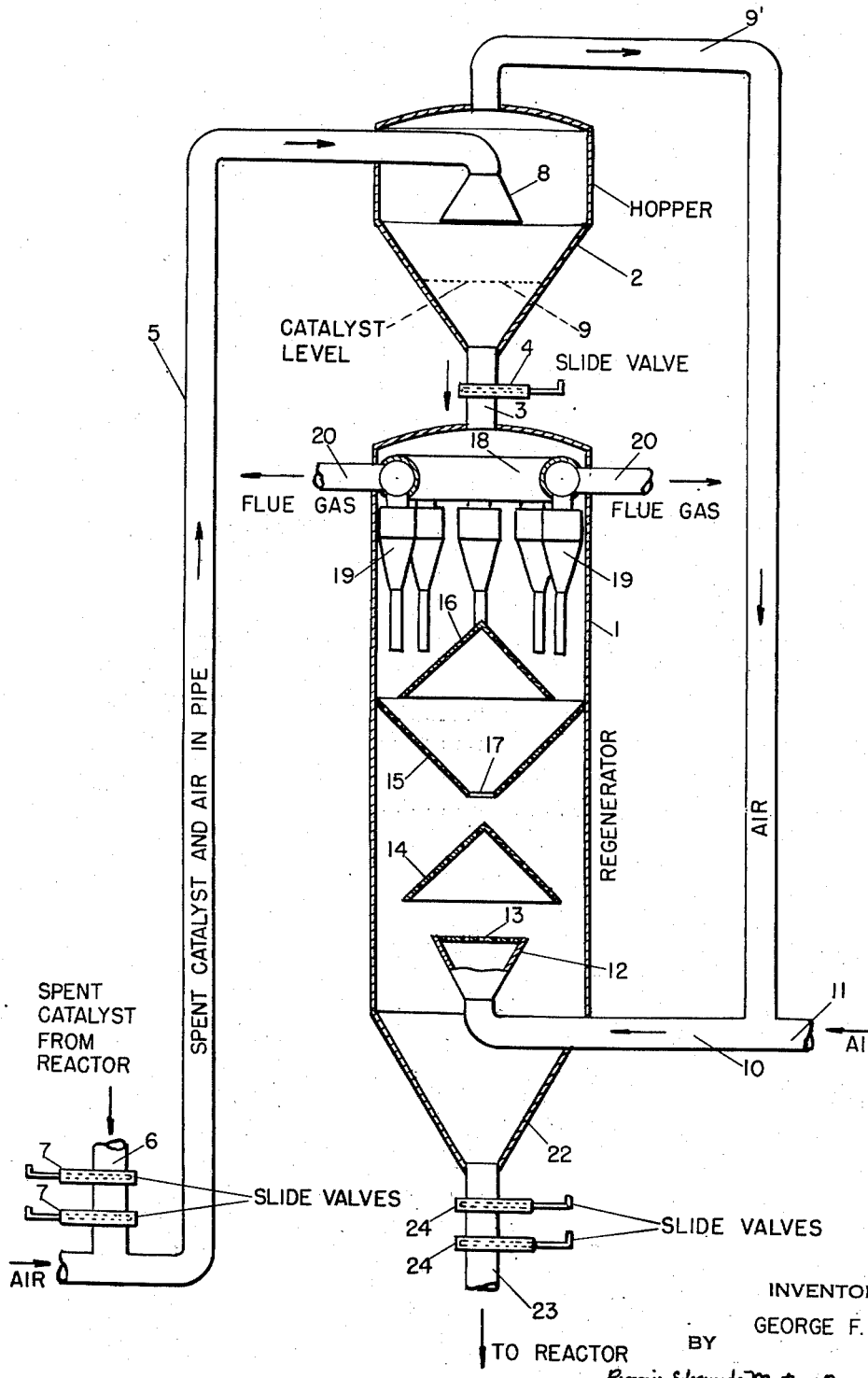

2,579,678

UNITED STATES PATENT OFFICE 2,579,678

CATALYST REGENERATION

George F. Kuhn, Sinclair, Wyo., assignor to Sinclair Refining Company, New York, N. Y., a corporation of Maine Application June 21, 1947, Serial No. 756,288

2 Claims. (Cl. 252—418)

This invention relates to pyrolytic conversion of hydrocarbons and more particularly to pyrolytic conversion processes involving the use of catalysts.

In the conversion of hydrocarbon base stocks to produce products having desired properties, such as high octane number for use in gasoline, the stock is submitted to one of several processes, such as cracking, hydrogenation, dehydrogenation, etc., in the presence of a catalyst.

The present invention is directed to a fluid catalyst process and more particularly to regeneration of the catalyst in a counter-current regenerator. More specifically the invention is directed to a process in which spent catalyst is conveyed by air to a container or hopper arranged over the regenerating chamber and the air, after separation from the catalyst by gravity, is mixed with additional air, if desired, and delivered to the bottom of the regenerating chamber. The catalyst flows downwardly by gravity through the regenerating chamber counter-current to the air and a series of distribution grids are arranged in the regenerating chamber to provide more intimate mixing of the catalyst and air. The catalyst is removed from the bottom of the regenerating chamber and the flue gases are exhausted from the top.

The invention further comprises apparatus consisting of a regenerating chamber with a hopper or container for the catalyst over the regenerating chamber, a delivery pipe connecting the two, a conduit to deliver air and spent catalyst into the hopper or container and a pipe extending from the hopper or container to the bottom of the regenerating chamber.

In the accompanying drawing I have shown, more or less diagrammatically, in vertical section, an organization of apparatus elements suitable for use in practicing the process and forming a part of the invention.

Referring to the drawing, the reference numeral 1 designates a regenerating chamber which is constructed in any suitable manner and, because of the heat developed therein, is preferably provided with a fire-brick lining (not shown). Over the chamber, I provide a hopper or container 2 for the spent catalyst. This container is connected to the top of the regenerating chamber by a pipe 3 having a slide valve 4 arranged therein.

The spent catalyst is delivered to the container 2 through pipe 5. The catalyst from the reactor passes into the pipe 5 from a pipe 6, delivery of the catalyst being controlled by valves 7. Adjacent the pipe 6, the pipe 5 is provided with an air injector to deliver air from a blower which picks up the spent catalyst and conveys it into the container 2. The end of pipe 5 within the container may be flared as indicated at 8 and the level of catalyst within the container is indicated by the dotted line 9.

As the catalyst falls by gravity in the container or hopper 2, the air separated therefrom flows through pipe 9' to a pipe 10. Additional air may be delivered to the pipe 10 as indicated at 11. As shown, the pipe 10 enters the regenerating chamber adjacent the bottom and is provided with a flared end 12. A grid 13 is arranged over this pipe. A series of substantially conical shaped grids 14, 15 and 16 are arranged within the regenerating chamber, the grids being preferably alternately reversed, that is, the grids 14 and 16 having their bases at the bottom and the grid 15 having its base at the top. The grid 15 is provided with a central opening 17 to permit catalytic material passing over this grid to fall upon the grid 14. The upper part of the regenerating chamber is provided with a pipe 18 having one or more inlets provided with cyclone separators 19 and connected to one or more outlets 20 for flue gas. Catalyst passing through the regenerating chamber collects in the bottom. The bottom of the regenerating chamber may be funnel-shaped as indicated at 22 to communicate with the pipe 23 having one or more valves 24 arranged therein.

In regenerating catalyst in the apparatus herein illustrated by the process forming a part of this invention, spent catalyst from the reactor in finely divided form is passed through pipe 6 by opening valves 7 into pipe 5 where it is carried by air into the top of container 2. The catalyst, even in rather finely divided particles, tends to settle out of the air and goes to the bottom of the container or hopper 2 as indicated by the dotted line 9. The air from which most of the catalyst has been removed exhausts through pipe 9' into pipe 10. Under some conditions, additional blower air is delivered through pipe 10 as indicated at 11 and the air flows through the grid 13 into the bottom of the regenerator.

Catalyst accumulated in the container or hopper is released through slide valve 4 into the top of the regenerating chamber and flows by gravity through the regenerating chamber counter-current to the up-floating air stream. The distributors 14, 15 and 16 provide more intimate mixing of the catalyst and the air and thus promotes regeneration. The flue gas, resulting from the burning of the carbonaceous material on the catalyst particles, passes through cyclone separators 19 to exhaust pipe or pipes 20. The regenerated catalyst collects in the bottom 22 of the regenerating chamber, as indicated at 21, and is removed therefrom through the pipe 23 by opening valves 24.

I claim:

1. In the step of regenerating finely divided catalyst which has been used in the pyrolytic conversion of hydrocarbons by the process comprising the subjecting of the hydrocarbon to be converted to conversion temperatures in the presence of the catalyst whereby carbonaceous material is deposited thereon and the catalyst is intermittently regenerated by burning off the deposited carbon by passing air in contact therewith, the improvement which comprises suspending the catalyst in a current of air and conveying it thereby to an elevated chamber, separating catalyst from the air in the chamber and passing the separated catalyst by gravity to and downwardly through a regenerating chamber positioned at an elevation lower than that of the first said chamber, withdrawing the air from the elevated chamber and passing it to a lower zone of the regenerating chamber and upwardly through the chamber in contact with the downwardly flowing catalyst.

2. The process of claim 1 in which the air separated from the catalyst in the upper chamber is admixed with additional air prior to introduction to the regenerating chamber.

GEORGE F. KUHN.

REFERENCES CITED

The following references are of record in the file of this patent:

UNITED STATES PATENTS

| Number | Name | Date |
|---|---|---|
| 2,304,128 | Thomas | Dec. 8, 1942 |
| 2,384,311 | Kearby | Sept. 4, 1945 |
| 2,401,739 | Johnson | June 11, 1946 |
| 2,408,600 | Berg | Oct. 1, 1946 |
| 2,440,620 | Taff | Apr. 27, 1948 |
| 2,444,128 | Anderson | June 29, 1948 |
| 2,465,255 | Moorman | Mar. 22, 1949 |

FOREIGN PATENTS

| Number | Country | Date |
|---|---|---|
| 574,892 | Great Britain | Jan. 24, 1946 |